United States Patent
O'Donnell et al.

(10) Patent No.: US 9,579,742 B2
(45) Date of Patent: Feb. 28, 2017

(54) SERIES ARC WELDER

(75) Inventors: Timothy M. O'Donnell, Chesterland, OH (US); Russell K. Myers, Hudson, OH (US)

(73) Assignee: Lincoln Global, Inc., City of Industry, CA (US)

( * ) Notice: Subject to any disclaimer, the term of this patent is extended or adjusted under 35 U.S.C. 154(b) by 2289 days.

(21) Appl. No.: 11/327,736

(22) Filed: Jan. 9, 2006

(65) Prior Publication Data

US 2007/0158324 A1    Jul. 12, 2007

(51) Int. Cl.
*B23K 9/10*      (2006.01)
*B23K 9/12*      (2006.01)
*B23K 9/173*     (2006.01)
*B23K 9/18*      (2006.01)

(52) U.S. Cl.
CPC ........... *B23K 9/1068* (2013.01); *B23K 9/124* (2013.01); *B23K 9/1735* (2013.01); *B23K 9/188* (2013.01)

(58) Field of Classification Search
CPC ......... B23K 9/10; B23K 9/1068; B23K 9/124
USPC ............... 219/130.51, 137.7, 137.2, 137 PS, 219/137.71; 318/34, 45, 71
See application file for complete search history.

(56) References Cited

U.S. PATENT DOCUMENTS

| | | | |
|---|---|---|---|
| 2,669,640 A | | 2/1954 | Outcaltet et al. |
| 2,938,107 A | * | 5/1960 | Pease ...................... 219/137.71 |
| 3,562,612 A | * | 2/1971 | Munson ........................ 318/106 |
| 4,246,463 A | * | 1/1981 | Shutt et al. .................. 219/73.2 |
| 4,301,355 A | * | 11/1981 | Kimbrough et al. ... 219/137 PS |
| 4,700,042 A | * | 10/1987 | Ferrero et al. ................ 219/110 |
| 4,798,929 A | * | 1/1989 | Itoh ............................. 219/69.12 |
| 5,973,291 A | * | 10/1999 | Kramer et al. .......... 219/130.01 |
| 6,207,929 B1 | * | 3/2001 | Stava et al. .............. 219/130.51 |
| 6,291,798 B1 | * | 9/2001 | Stava ....................... 219/130.32 |
| 6,872,914 B2 | * | 3/2005 | Hsu .......................... 219/130.51 |

(Continued)

FOREIGN PATENT DOCUMENTS

| DE | 4112760 A1 | * 10/1992 | ............. B41F 13/00 |
|---|---|---|---|
| GB | 1 502 288 A | 3/1978 | |

(Continued)

OTHER PUBLICATIONS

European Search Report, Munich, Oct. 30, 2007, Jeggy, Thierry.

*Primary Examiner* — Dana Ross
*Assistant Examiner* — Ayub Maye
(74) *Attorney, Agent, or Firm* — Hahn Loeser & Parks LLP (57) ABSTRACT

An electric arc welder for depositing weld metal along a groove between two edges of a metal workpiece. The welder comprises: a leading electrode driven toward a point in the groove by a first wire feeder operated at a first speed by a first motor with a speed control input and a tachometer derived first feedback signal, a trailing electrode driven toward the same point by a second wire feeder operated at a second speed by a second motor with a speed control input and a tachometer derived second feedback signal, a first power source directing a first current to flow through the leading electrode and a second power source causing a second current to flow through the trailing electrode with the current flow being in a series arc circuit. The second power source being grounded to the workpiece to modify the series arc current so ground current flows to the workpiece whereby the second current is generally equal to the first current minus the ground current.

52 Claims, 10 Drawing Sheets

(56) References Cited

U.S. PATENT DOCUMENTS

| | | | |
|---|---|---|---|
| 7,041,937 B2* | 5/2006 | Ihde et al. | 219/137.71 |
| 7,183,516 B2* | 2/2007 | Blankenship et al. | 219/130.31 |
| 2003/0071025 A1* | 4/2003 | Hsu | 219/130.5 |
| 2006/0037952 A1 | 2/2006 | Myers et al. | |
| 2006/0163230 A1* | 7/2006 | Kaufman | 219/137.71 |

FOREIGN PATENT DOCUMENTS

| | | | | |
|---|---|---|---|---|
| JP | 51013347 | * | 2/1976 | |
| JP | 56 004381 A | | 1/1981 | |
| SU | 1540996 A | * | 2/1990 | B23K 37/04 |
| SU | 1540996 A | * | 2/1990 | |

\* cited by examiner

SERIES ARC WELDER

The present invention relates to the art of electric arc welding and more particularly to an improved series arc welder as disclosed in Shutt U.S. Pat. No. 4,246,463.

INCORPORATION BY REFERENCE

For over twenty years, submerged arc welding has often been performed by a series arc process wherein two welding wires are fed to an intersecting point above the workpiece with an electric arc between the two advancing welding wires. The wires or electrodes are melted to deposit metal into the groove between two spaced metal plates to be joined. These may be a seam in a pipe or pipeline. In the mid-1970's, this well known submerged arc welding process was modified to create not only an arc between the two intersecting electrodes, but also an arc between the electrode and the workpiece to stabilize the melting arc. This improvement is called the modified series arc welding process and is described in Shutt U.S. Pat. No. 4,246,463, incorporated by reference herein. This prior patent also describes in detail the prior series arc welding process. These two procedures are used primarily in submerged arc welding as the leading process to join the gap between the spaced plates preparatory to a subsequent tandem welding operation by one or more following electrodes. Background to the present invention is the series arc welder and the modified series arc welder as described and shown in Shutt U.S. Pat. No. 4,246,463.

THE INVENTION

In accordance with the first aspect of the invention, there is provided an electric welder for depositing weld metal along a groove between two edges of a metal workpiece. The welder comprises a leading electrode driven toward a point in the groove by a first wire feeder operated at a speed by a first motor having a speed control input. A trailing electrode is driven toward the same point by a second wire feeder operated at a second speed by a second independent motor with a speed control input. A power source creates an arc between the electrodes to melt the electrodes and fill the groove. The first motor for the first wire feeder has a tachometer to generate a feedback WFS signal. This signal is the feedback signal to the single power source including a wire feed speed controlling device or program for creating a control WFS signal. The control input of the first motor receives the WFS signal so this first wire feeder is driven at a set speed based on the feed signal. The power source generates only one WFS signal to control the wire feed speed of the first wire feeder. The second wire feeder is driven by a slave circuit connected to the WFS signal for controlling the the second wire feeder.

In the past, a series arc welder has two wire feeders with a single WFS signal for both wire feeders. Thus, neither wire feeder operated at optimum feed speed. By using the present invention, a single power source creates a single WFS signal for both wire feeders; however, this single signal is controlled by a feedback loop from one of the first wire feeders so that the speed of at least one wire feeder is optimized. The other electrode of the welder is driven by a slave circuit. Using the invention for a series arc welder, a single power source creates a controlled wire feed speed for one of the motors and the other motor is driven by a slave circuit. In accordance with another version of the present invention, the slave circuit includes a device for decreasing the level of the feedback control WFS signal used for control of the first wire feeder. This reduced level signal is then the control input of the motor for the second wire feeder. In this manner, the feedback controlled signal from the single power source drives one wire feeder at a controlled speed and the other wire feeder by a reduced signal creating a lower speed. If the feedback controlled first wire feeder is to operate at a speed less than the slave circuit driven wire feeder, a device is used to reduce the level of the control signal from the power source before it is directed to the first wire feeder. Consequently, in accordance with the present invention, the power source creates a feedback signal for controlling one wire feeder. The same signal operates through a slave circuit to control the other wire feeder. To adjust the relative speed between the two motors, either the master circuit or the slave circuit can be provided with a device such as a resistor to decrease the level of input control for each of the two wire feeders. Different speeds can also be obtained by using the single feedback WFS signal with different ratio gear reducers in the two motors. In this manner, the first motor is controlled by its feedback WFS signal, but a slave circuit controls the other motor to operate at a different speed, even though the magnitude of the actual control signal from the power source is the same.

The invention can be used in both a series arc welder and a modified series arc welder where a single motor creates a single output signal. In the past, one signal controlled two separate wire feeders, unless complicated internal programming was provided in the wire feeder. The present invention uses a master feedback control for one of the wire feeders and a novel slave control concept for controlling the speed of the other wire feeder.

In accordance with another aspect of the present invention, the series arc welder is driven by two separate power sources connected to the leading and trailing electrodes. Current in the leading electrode is directed through the trailing electrode in accordance with a series arc configuration. Since there are two separate power sources, each of the motors for the wire feeder has a tachometer to create a feedback signal whereby each of the wire feeders is controlled to the desired wire feed speed. The desired wire feed speed is adjusted by an arc voltage feedback so the feed speed is controlled by the arc length. Using this concept, a selected voltage associated with the first electrode and a selected voltage associated with the second electrode are used to adjust the desired wire feed speeds of the separate wire feeders. The feedback voltage adjusts the desired wire feed speed and is compared with the feedback signal from the tachometer. Thus, using two power sources, each of the wire feeders is controlled with feedback from the drive motor of the feeder. To adjust the desired speed the voltage associated with the two electrodes is used. Two power sources constitute a novel configuration for a series welder. It also is novel for a modified series welder.

In accordance with an aspect of the invention, the single power source in the first embodiment and the two power sources in the second embodiment use a connection to the workpiece. This creates a modified series welder and transfers the arc from between the two electrodes only to an arc that is also between the two electrodes and workpiece. In this modified series procedure, the inventive control of the wire feeders as previously described prevents instability when there is a short between the electrode and the workpiece. When there is a short, the ground current from the electrodes to the workpiece increases substantially. Since the current on the trailing electrode is the difference between the current on the leading electrode and the ground current, the second or trailing electrode has drastically reduced current. A typical power source is programmed to increase or ramp up its output current when there is a short circuit to clear the short. When the standard short clearance routine is executed by a detected short the increased current from the power source attempts to control the current in the ground connection and actually reduce the current in the short circuit. This is an unstable situation that is associated with a short in either the series arc welder or the modified series arc welder. In accordance with another aspect of the invention, a short circuit is detected. At that time, a program is used to clear the short by controlling the current of the second power source. The program can perform in various routines. For instance, a routine can decrease the current in the second power source or can maintain the current in the second power source substantially constant. The second power source is a constant current power source to execute these programmed routines.

In accordance with an aspect of the invention, when two power sources are used, they can be connected in either series or in parallel. Furthermore, they can be connected in a series arc or modified series arc configuration.

The primary object of the present invention is the provision of an improved series arc welder. Yet another object of the invention is the provision of a welder as defined above, which welder uses a single power source accurately controlling the wire feed speed of the leading electrode. Another object of the present invention is the provision of a welder using two power sources with feedback control of both wire feeders.

Still a further object of the invention is the provision of welders as defined above, which welders are connected in modified series wherein current is provided to the workpiece for creating a controlled arc between the intersecting electrodes.

Still a further object of the present invention is the provision of a modified series arc welder having improved control of the wire speed during operation of the welder and having a circuit for controlling the current in the power source when there is a short circuit.

These and other objects and advantages will become apparent from the following description taken together with the accompanying drawings.

PREFERRED EMBODIMENT

Figure 1:
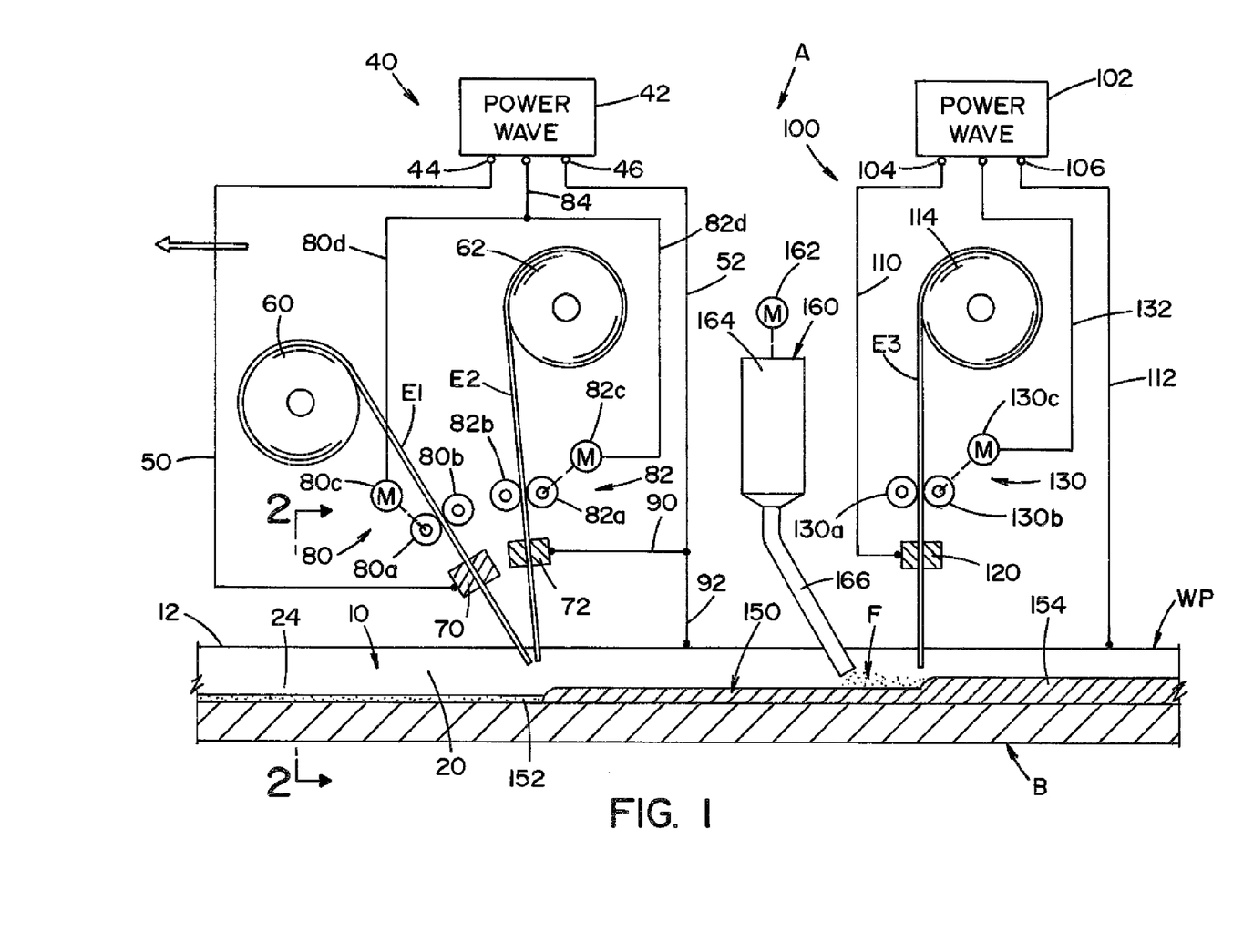
FIG. 1 is a wiring diagram of the first embodiment of the present invention.
Figure 2:
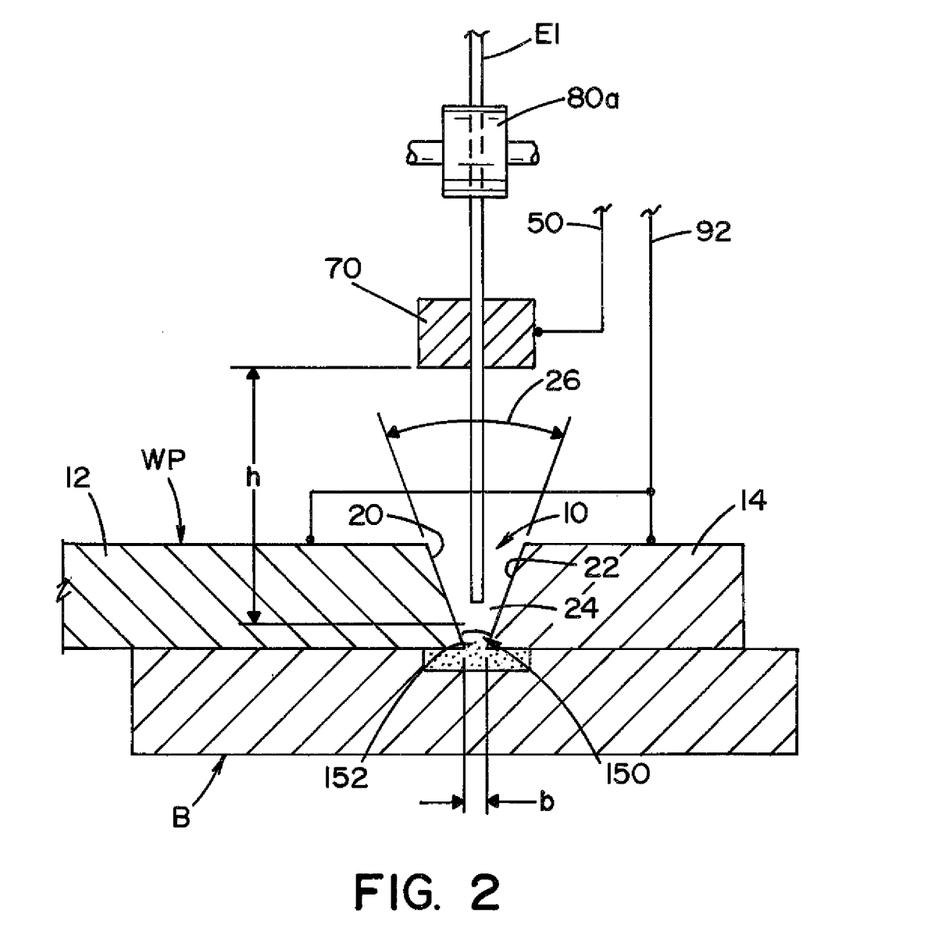
FIG. 2 is an enlarged cross-sectional view taken generally along line 2-2 of FIG. 1.
Figure 11:
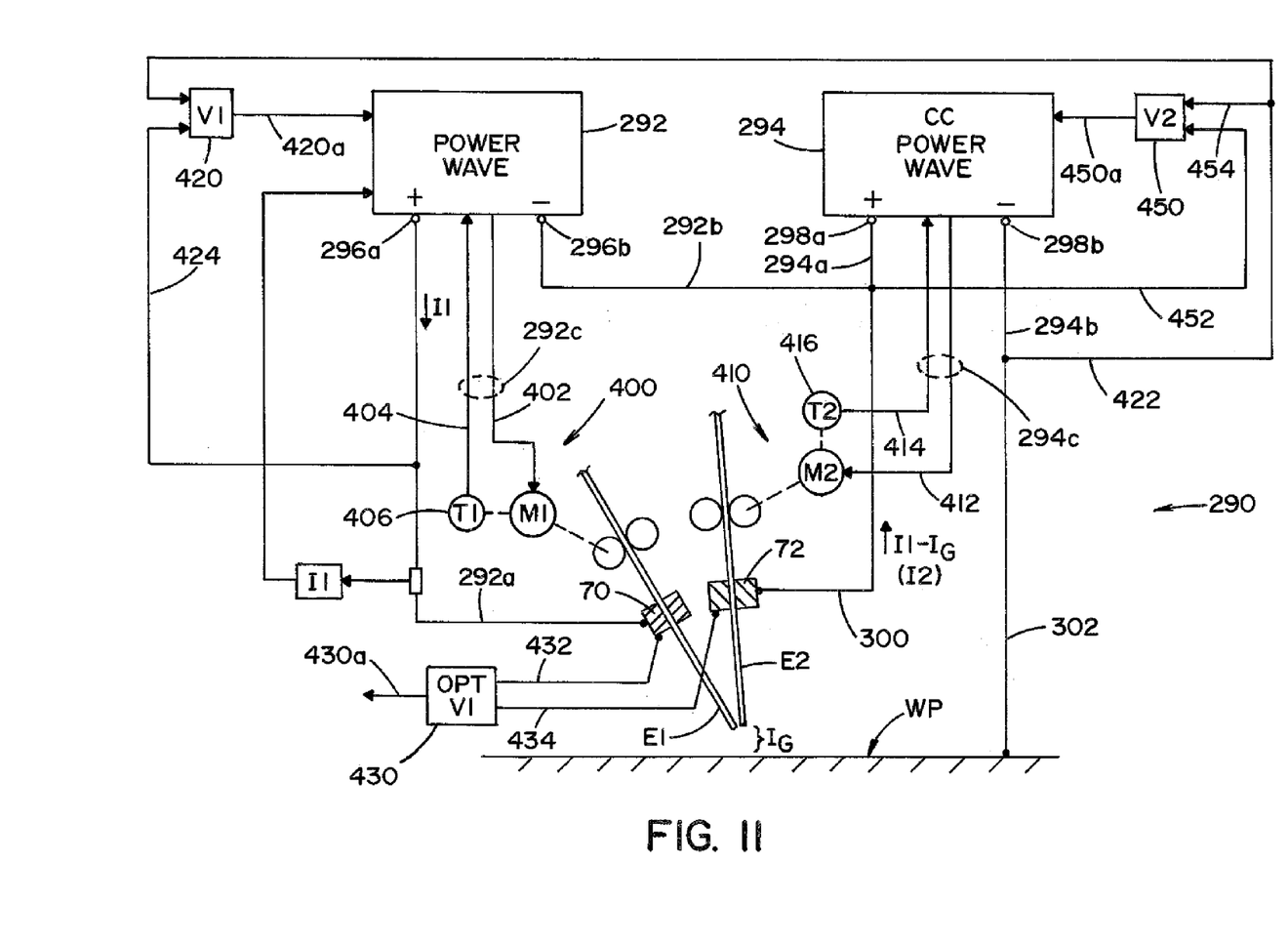
FIG. 11 is a wiring diagram of the second embodiment of the present invention utilizing two power sources for a modified series arc welding process.

Referring now to the drawings wherein the showings are for the purpose of illustrating the preferred embodiment of the invention and not to limit same, FIGS. 1 and 2 show an arc welder A using a modified series concept as described in Shutt U.S. Pat. No. 4,246,463 incorporated by reference herein. The invention involves an electric arc welder schematically illustrated as a submerged arc process. The weld performs tandem electric arc welding where first electrode E1 and second electrode E2 are connected in modified series. Subsequent electrodes, one of which is illustrated as electrode E3, travel in unison with electrodes E1 and E2 and perform a tandem sub arc welding process. Of course, more than one trailing electrode E3 is normally used. The technology described in Shutt U.S. Pat. No. 4,246,463 is applicable to electric arc welder A used to deposit metal in groove 10 of workpiece WP. In the illustrated embodiment, workpiece WP is spaced plates 12, 14 with a small gap b where edges 20, 22 and backplate B define trough or groove 24 having an angle 26, best shown in FIG. 2. Electrodes E1, E2 are directed toward a point in groove 24, best shown in FIG. 2. This point is below the electrical contact sleeve or tip 70, and defines a stickout h. Referring now more specifically to FIG. 1, mechanism 40 contains electrodes E1, E2 and drives them along groove 10 and includes a main power source 42, with output terminals 44, 46 to direct AC current by way of leads 50, 52 to the respective electrodes E1, E2. These electrodes are welding wires supplied from spool 60, 62, respectively, and driven through contacts tips 70, 72 by standard wire feeders 80, 82, respectively. Wire feeder 80 includes drive rolls 80a, 80b rotated by a motor 80c. In a like manner, wire feeder 82 includes drive rolls 82a, 82b rotated by motor 82c. Leads 80d and 82d are both powered by a control signal in line 84 from main power source 42. The power source is a Power Wave unit manufactured by The Lincoln Electric Company of Cleveland, Ohio and is generally the state table operated welder disclosed in Blankenship U.S. Pat. No. 5,278,390. Power source 42 is used to control both wire feeders 80, 82. This results in a limitation, since only a single signal is available from the power source to drive the wire feeder. Consequently, the signal on line 84 must be a compromise signal between the desired wire feed speed of electrodes E1, E2. In practice, the single signal on line 84 drives both wire feeders. This is an open loop control based upon the desired wire feed speed loaded into the controller of power source 42. However, as explained later, separate signals for the wire feeder are created when using two power sources, as shown in FIG. 11.

Lead 52 is connected to contact tip 72 by line 90 and is connected to workpiece WP by line 92. Thus, current flow between electrode E1 and power source 42 is through a low resistance line 90 and a higher resistance line 92. The resistance of these return paths divides the current flow to adjust the heat in the arc and control penetration by the arc force in the welding process, as described in Shutt U.S. Pat. No. 4,246,463. By using the two electrode mechanism 40, high metal deposition is obtained by using series connected electrodes E1, E2 while actually using low heat. A limited amount of current flows from electrode E1 into the workpiece during the welding operation. This welding process of each power source is controllable in accordance with the preferred embodiment of the present invention, by the program and architecture schematically illustrated in FIG. 3.

In accordance with the practical embodiment of the invention, electrodes E1 and E2 are trailed by at least one electrode E3, shown in FIG. 1. This trailing electrode is moved by single electrode mechanism 100 in unison with two electrode mechanism 40 moving electrodes E1, E2. The two mechanisms may be integrated or separately operated. In the preferred embodiment, the same moving device is used for mechanisms 40, 100. The trailing electrode mechanism includes auxiliary power source 102 which is also a Power Wave unit manufactured by The Lincoln Electric Company of Cleveland, Ohio and operated by the technique shown in FIG. 3. Power source 102 has output terminals 104, 106 for directing an AC current waveform by way of lines 110, 112 to employ electrode E3 in a submerged arc welding process. Electrode E3 is a wire supplied by spool 114 and is driven through contact tip 120 by wire feeder 130. This feature is similar to wire feeders 80, 82 of electrodes E1, E2. Wire feeder 130 has spaced drive rolls 130a, 130b rotated by a motor 130c. A control signal from power source 102 in line 132 drives motor 130c to feed electrode E3 toward workpiece WP at a speed determined by the signal in line 132.

In operation of the embodiment illustrated in FIGS. 1 and 2, electrodes E1, E2 and trailing electrode E3 create a weld puddle 150 in groove 10. Electrodes E1, E2 create a first root pass that joins or tacks edges 20, 22 together by melting the inwardly projecting portions of groove 10. Granular flux 152 is deposited in front of electrode E1. Thereafter, puddle 150 is formed to displace flux 152 and is covered by bead 154 deposited by electrode E3. In practice, all electrodes are used in a submerged arc welding process. Flux dispenser 160 is moved in front of electrode E3 and has a dispensing motor 162 for dispensing flux F from hopper 164 through tube 166 in accordance with standard submerged welding technology. A similar flux dispenser 160 is then provided above groove 10 in front of electrode E1 to deposit flux 152. In practice, a shielding gas is employed around electrodes E1, E2. The present invention utilizes a Power Wave power source for the main power source 42 and for the auxiliary power source 102 having output terminals 104, 106. These power sources are operated by a digital controller and use a waveform technology process pioneered by The Lincoln Electric Company where the power sources create waveforms defined by a state table. A series of individual current pulses created at a high switching speed in excess of 18 kHz cause a selected waveform to be outputted from the power source. In practice, the waveforms are provided by a series of current pulses created at a rate of over 40 kHz. In this manner, both leading mechanism 40 and following mechanism 100 include a power source that outputs a desired AC waveform to optimize the welding process for the two series electrodes E1, E2, as well as the trailing electrode E3. Such power source operation is schematically illustrated in FIG. 3, which represents the type of power sources used in practicing the preferred embodiments of the present invention and shown in FIGS. 1 and 11.

Figure 3:
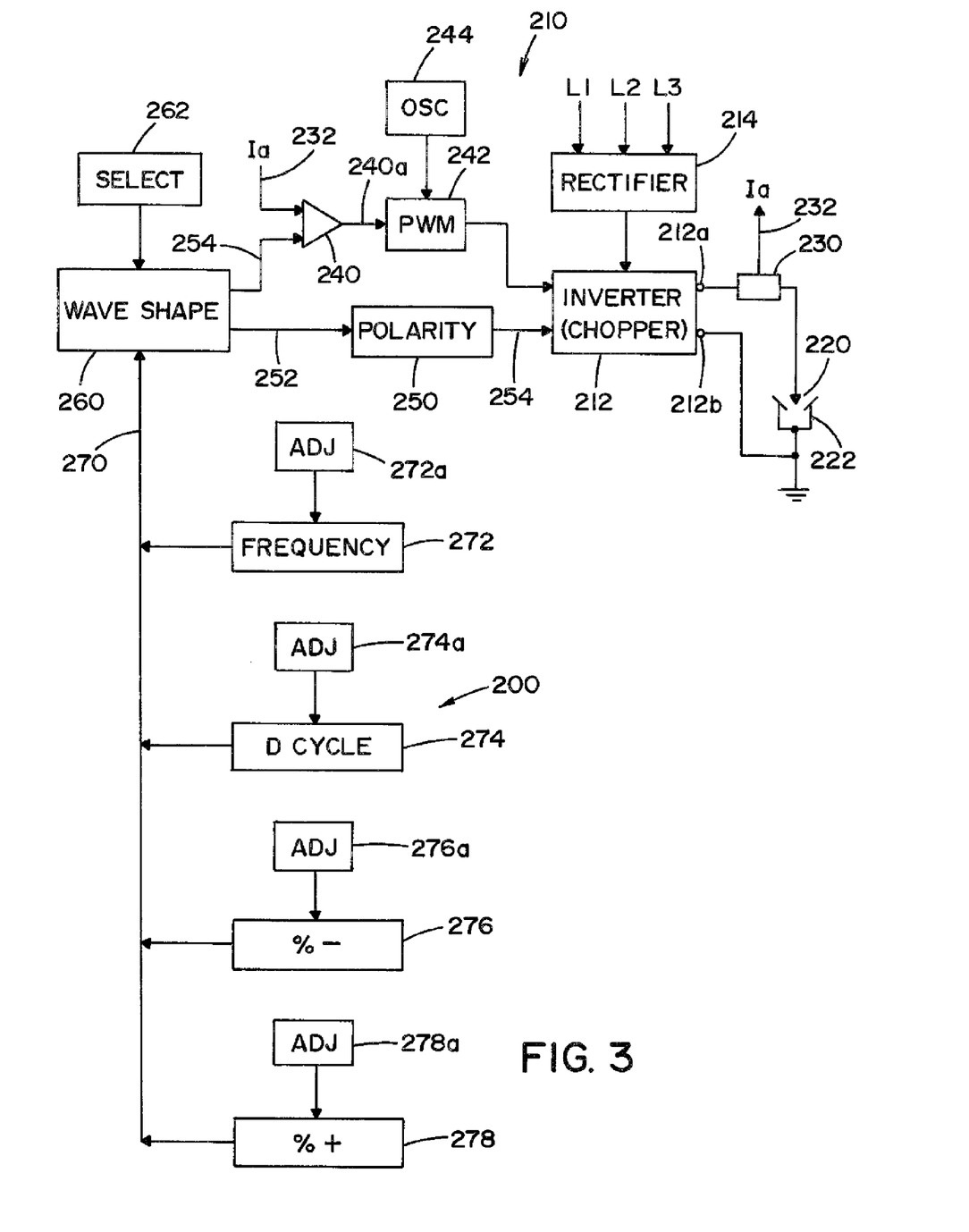
FIG. 3 is a block diagram of the Power Wave power source used in the single power source of the first embodiment shown in FIG. 1 and also used for both power sources of the second embodiment shown in FIG. 11.
Figure 10:
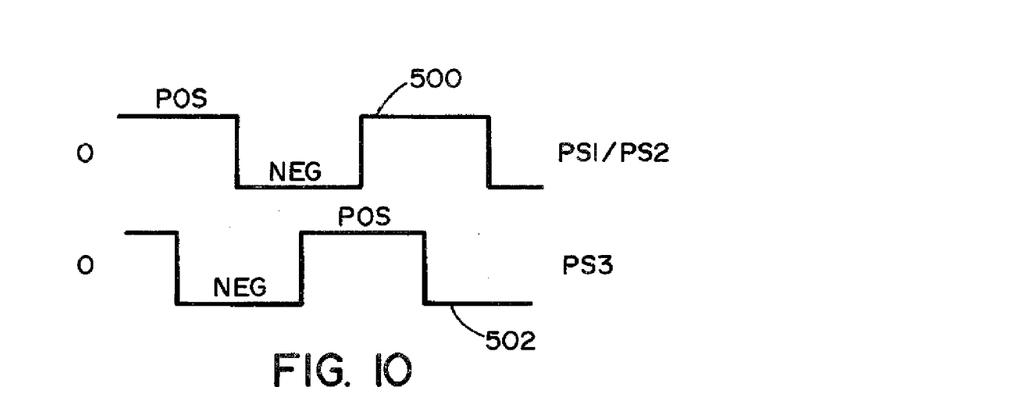
FIG. 10 is the AC waveform used for the three power sources shown in FIGS. 8 and 9.

System 200 of the present invention is schematically illustrated in FIG. 3 wherein a Power Wave power source 210 has an input supply 214 and a high switching output stage 212 with output terminals 212a and 212b. Output stage 212 creates an AC waveform at output terminals 212a, 212b to perform an AC arc welding process at the weld station illustrated as including electrode 220 and workpiece 222 and having a current shunt 230 to output a signal in line 232. This signal represents the current of the welding process being performed. Comparator 240 receives the signal on line 232 and has an output 240a with a voltage controlling pulse width modulator circuit 242, which can be digital or analog and has a variety of configurations. The pulse width modulator is driven at high speed by oscillator 244 which, in practice, operates at a frequency of about 40 kHz. This frequency of the oscillator drives the pulse width modulator and provides a series of current pulses at a high speed switching rate to create an AC waveform at the weld station. The polarity of the waveform is controlled by the logic or signal from network 250 having an input line 252 from waveform generator 260 and an output line 254 for controlling the polarity of the waveform outputted from stage 212 of the Power Wave power source unit. The profile of the waveform comprising a series of rapidly created pulses is controlled and dictated by waveform generator 260 having a select network 262 which selects the desired waveform to be created at output terminals 212a, 212b of stage 212. By the selected waveform from network 262, the desired waveform is created for use by the electric arc welding mechanisms 40 and 100. To control the waveform used for the series connected electrodes E1, E2, system 200 includes waveform adjusting circuits 272-278, each having adjusting networks 272a-278a. Circuit 272 adjusts the frequency of the waveform. After the waveform is selected by network 262, a signal from circuit 272 adjusts the frequency of the AC waveform. In a like manner, the duty cycle of the waveform is controlled by circuit 272. Duty cycle is the time the waveform is in the positive polarity compared to the time in the negative polarity. Circuits 276 and 278 control the magnitude of the current during the negative portion of the waveform or the positive portion of the waveform. Circuit 276 is to adjust the magnitude of the negative portion of the waveform. Circuit 278 adjusts the magnitude of the positive portion of the waveform. The waveform used for electrodes E1, E2 is an AC waveform. However, a DC waveform could be used for a trailing electrode E3, although AC current is preferred. Indeed, it is preferred to use an AC waveform for all electrodes of electric arc welder A as shown in FIG. 10. Other circuits have been used to adjust the signal on line 270 to modulate and change the profile of the wave shape selected by network 262 to optimize welding at the intersection of electrodes E1, E2.

Figure 14:
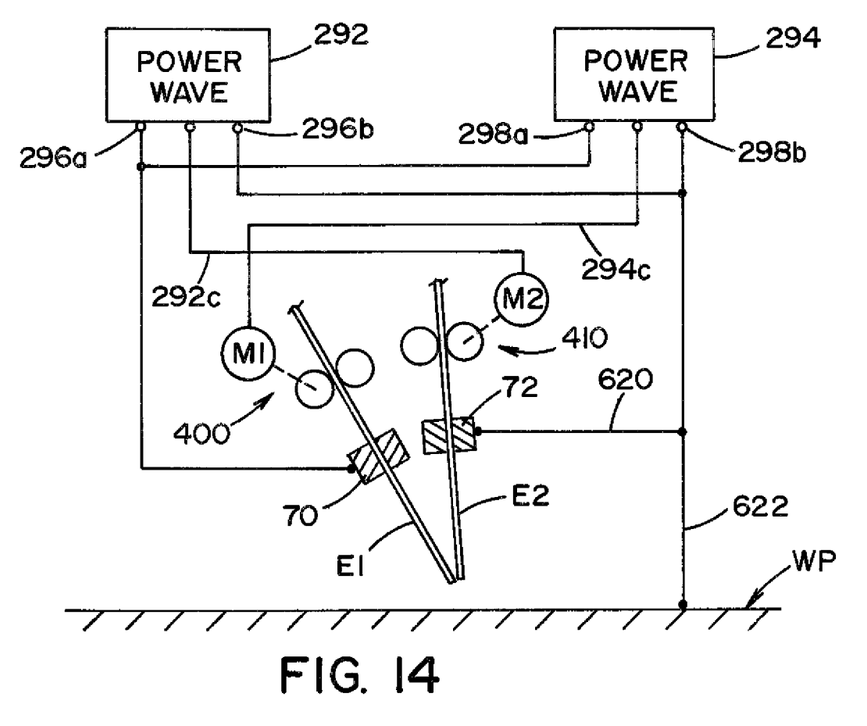

A two power source modification of the preferred embodiment illustrated in FIGS. 1-3 is schematically illustrated in FIG. 11 which shows tandem electrode welder 290 including a main power source 292 and a second power source 294. The main power source 292 has output terminals 296a and 296b. These terminals are connected to leads 292a and 292b, respectively. Lead 292a connects the one output of power source 292 to contact tip 70 of electrode E1. Lead 292b is connected to line 300 for current flow in a path to and from electrode E2. To connect terminal 296b in the path of the workpiece ground, second power source 294 is connected in series between terminal 296b and workpiece WP using lead 294b. Second power source 294 has terminals 298a connected to lead 294a and terminal 298b connected to lead 294b. In this manner, second power source 294 is in series with the lead 294b connected to terminal 298b and lead 302. In this architecture, electrode E1 carries full current and the current to and from electrode E1 is divided between electrode E2 and the circuit including leads 294b and 302. Lead 294a from terminal 298a is connected to lead 292b from power source 292. Consequently, the two power sources 292 and 294 are connected in series between the ground lead 294b and lead 292a. Between the two power sources, line 300 is connected to contact tip 72 of electrode E2. Consequently, electrodes E1 and E2 are in series with a ground current path through Power Wave power source 294. By using this arrangement, the waveforms used for both power source 292 and 294 are the same and are each created by a system 200 as shown in FIG. 3. Adjustments are made to the waveform process by power source 294 to control the current flowing in the ground path of the welder. Control of power source 294 is accomplished by regulating the current in lead or line 302 flowing to and from workpiece WP. Since two separate power sources are employed, wire feeder 80 is controlled by the signal on line 292c from power source 292. A second wire feeder signal in line 294c is controlled by power source 294. Welder 290 has the advantage of being able to control wire feeders 80, 82 separately without complex software in the power source digital control section. A main power source could have two parallel modules as illustrated in FIG. 14, but FIG. 11 uses series connected modules or power sources. The second power source is connected in series with the ground lead 302 to better control the current waveform in the ground return circuit or path.

The various technology concepts in Shutt U.S. Pat. No. 4,246,463 are applicable to the series arc connected welder shown in FIGS. 1-3 and shown in FIG. 11. These welders have two front electrodes connected in series and have a current return path through the workpiece. The front welders are combined with trailing welders to perform a tandem submerged arc weld.

Figure 4:
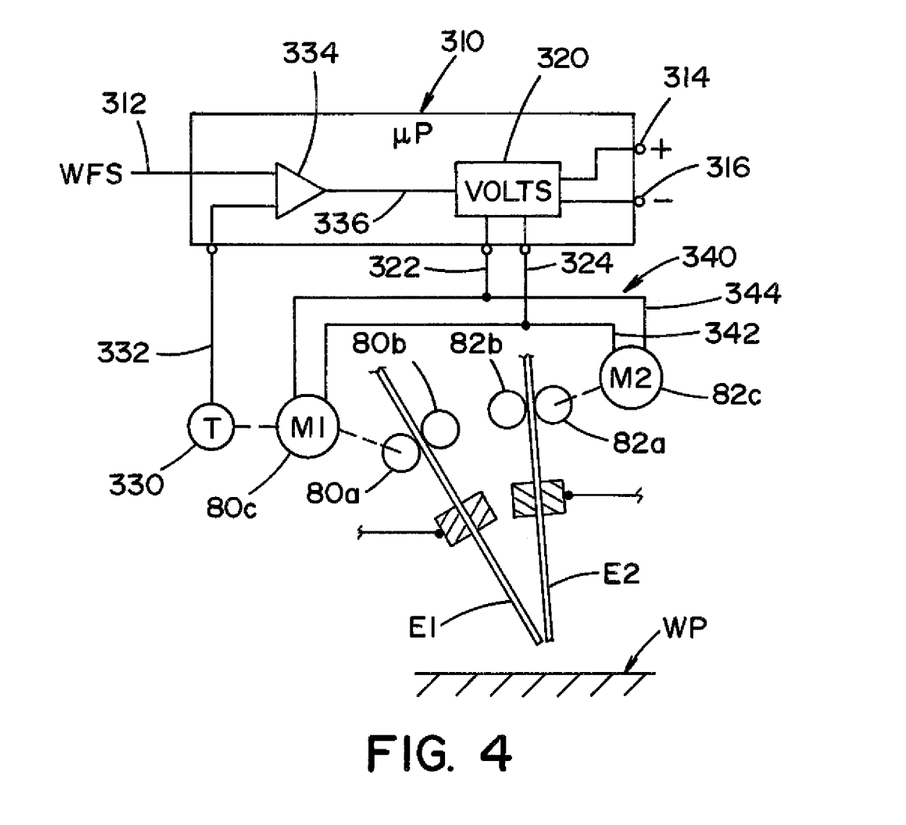
FIG. 4 is a schematic wiring diagram illustrating the inventive improvement in the embodiment of the invention.
Figure 5:
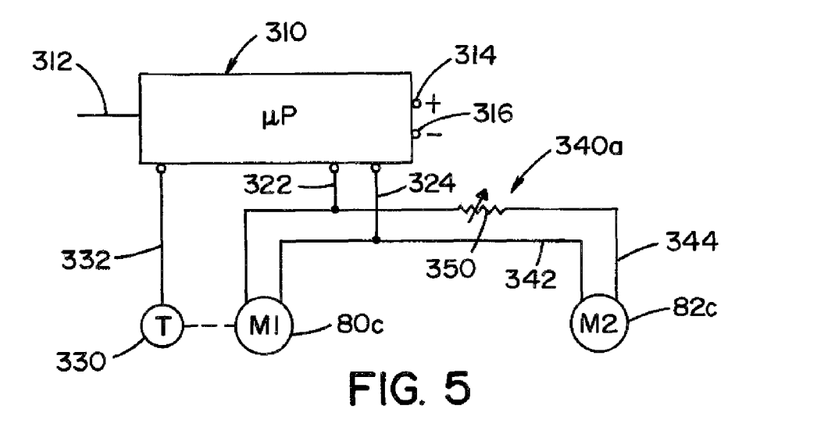
FIGS. 5, 6 and 7 are simplified wiring diagrams of a different version of the inventive improvement shown in FIG. 4.
Figure 6:
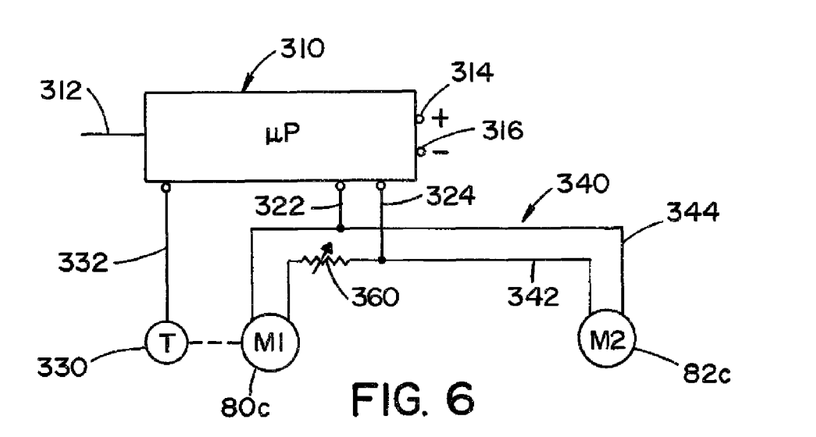
Figure 7:
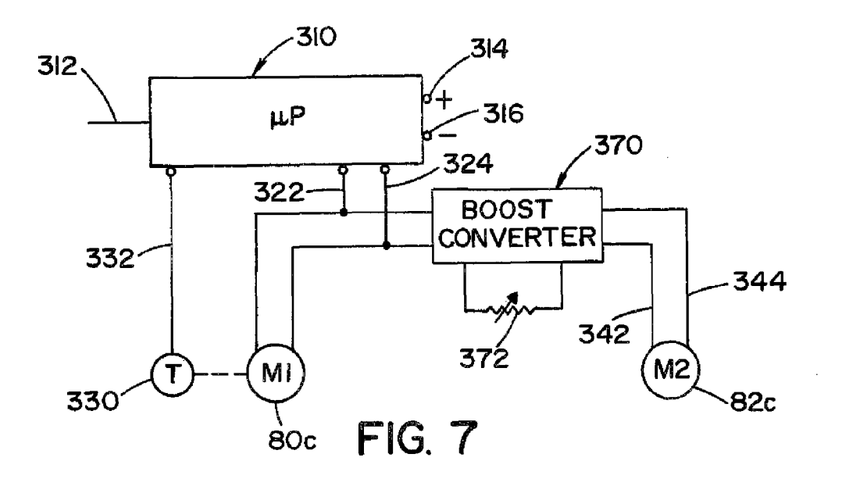

In accordance with the invention, when using a single power source as shown in FIGS. 1 and 2, the wire feeders are controlled by a single section 310 in the digital controller of power source 42. Controller section 310 receives a wire feed speed signal on line 312 and converts the DC voltage on terminals 314, 316 into a DC output signal from voltage signal generator 320 on output lines 322, 324. In accordance with normal practice the signal on line 312 is often adjusted to maintain a given arc length. In accordance with the wire feed speed control mechanism of FIG. 4 as using a single power source embodiment, the same DC voltage on lines 322, 324 is supplied to both motor 80c and motor 82c to drive electrode E1 and electrode E2 in unison toward the intersecting point, where a series arc is created to melt the electrodes and fill the gap in groove 10 of workpiece WP. In accordance with this arrangement, motor 80c has an output tachometer 330 creating a voltage on line 332. This voltage represents the speed of motor M1 driving leading electrode or wire E1 toward workpiece WP. First motor M1 is controlled by a feedback loop including error amplifier 334 generating an output error signal in line 336 determined by the relationship of the actual feed speed represented by the voltage on line 332 and the set or adjusted desired feed speed as represented by the voltage or digital signal on line 312. Consequently, motor M1 has a tachometer that generates a feedback WFS signal so the section 310 creates a control WFS signal across output lines 322, 324. First motor M1 is maintained at the set or adjusted wire feed speed represented by the voltage or digital signal on line 312. A slave circuit 340 is preferably formed as leads 342, 344 to drive motor 82c. In this implementation of the present invention, motor M1 and motor M2 are driven in unison by the same AC voltage. Slave circuit 340 is merely an extension of output lines 322, 324, so the voltage on both motor M1 and motor M2 are the same. Thus, the two motors are driven at the same speed and the lead motor M1 is regulated by a feedback loop. In this manner, one of the wire feeders is driven at optimum, desired speed. This speed is controlled. The other motor merely follows at a related speed. This novel feature is modified slightly as shown in FIGS. 5-7. In FIG. 5, the slave circuit 340a has a rheostat 350 so that the voltage on leads 342, 344 is adjusted to a lower level than the voltage on lines 322, 324. Consequently, motor M2 is adjusted to operate at a slightly slower speed than motor M1. In a like manner, motor M1 can be adjusted by rheostat 360 to operate at slightly lower speed than motor M2, as illustrated in the version shown in FIG. 6. Rheostat 360 is connected between lines 322, 324 and motor M1. Slave circuit 340 is the same as used in the version shown in FIG. 4. By using this version of the invention, motor M1 is driven at a fixed feedback control speed but the motor M2 is driven at a higher speed. By using the techniques or versions shown in FIGS. 5 and 6, the second motor is still driven as a slave; however, this slave driven motor can be operated at a speed below or a speed above the feedback speed of motor M1. A further version of this concept is illustrated in FIG. 7 wherein the slave circuit is boost converter 370 having an output controlled by rheostat 372. The voltage on leads 342, 344 is greater than the voltage on lines 322, 324. Motor M2 is driven at a speed higher than motor M1. Of course, a buck converter could be used for the slave circuit so that the voltage driving motor M2 is less than the voltage driving motor M1. In all instances, leading electrode E1 has a feedback loop controlled wire feed speed and trailing electrode E2 is driven at a speed in a fixed relationship to the speed of motor M1. One of the motors is optimized, while the other motor has a correlated wire feed speed. In accordance with another aspect of the invention, each of the motors M1, M2 could have a gear reducer with a different gear ratio. These concepts form an aspect of the invention wherein one of the wire feeders in a single power source version of the present invention is controlled by a standard feedback circuit whereas the second wire feeder is correlated with the first wire feeder in a master-slave arrangement.

As so far described, the invention is a version used with a single power source welder as shown in FIGS. 1-4. The second embodiment of the present invention is illustrated in FIG. 11 wherein a single power source is replaced by two power sources 292, 294 connected in series and already generally described. The concept of FIG. 4 used for the single power source welder is also applicable to the two power source welder of FIG. 11. The welder in FIG. 11 is provided with a first wire feeder 400 for driving electrode or wire E1 toward workpiece WP by motor M1. The first motor is controlled by signals through lead 292c connected to first power source 292 and shown as a coaxial cable. One of these signals is a voltage on line 402, which is a DC signal actually using two lines for directing a DC voltage signal to motor M1. Motor M1 has tachometer 406 to generate a voltage on line 404 which is the feedback signal used to control the wire feed speed and, thus, the DC voltage signal on line 402. In a like manner, second wire feeder 410 is driven by motor M2 through lead 294c which is actually a coaxial cable connected to the controller of second power source 294. Coaxial line or cable 294c includes a line 412 having a DC voltage for driving motor M2 at a speed determined by the level of the DC voltage. Tachometer 416 creates a voltage in line 414 forming the feedback signal to control the wire feed speed of feeder 410. Thus, power source 292 controls motor M1 of feeder 400 with a feedback loop. A feedback loop or circuit is also used to control the speed of feeder 410. Two power sources are used for the series arc welding by electrodes E1, E2. Each of the wire feeders is separately controlled by one of two power sources 292, 294. To adjust the desired wire feed speed controlled by the signal on line 404, it is necessary to sense a relevant voltage at a selected location in the welding associated with electrode E1. In the preferred implementation, a voltage is sensed by circuit or device 420 connected to the workpiece lead 302 by line 422 and to contact tip 70 by line 424. Circuit or device 420 provides a voltage on line 420a which adjusts the desired wire feed speed to be controlled by the signals through lead 292c. Other voltage associated with electrode E1 can be used to control the wire feed speed of feeder 400. Option circuit or device 430 has an output voltage on line 430a controlled by voltage between contact tips 70, 72 using lines 432, 434. To adjust the wire feed speed of second motor M2 voltage, voltage sensing circuit or device 450 has an output 450a with a voltage signal indicative of the voltage between contact tip 72 as read by line 452 and workpiece WP as read by line 454 from lead 302 through line 422. The signal on output line 450a adjusts the wire feed speed of feeder 410 and the signal on line 420a adjusts the wire feed speed of feeder 400. By using two separate power sources, the wire feeders 400, 410 can be separately adjusted to optimize the operation of the series welder shown in FIG. 11. Power sources 292, 294 are connected in series and are moved in unison along workpiece WP. The welding operation is a modified series arc process, even though the invention could be used in a series arc welding process.

Figure 8:
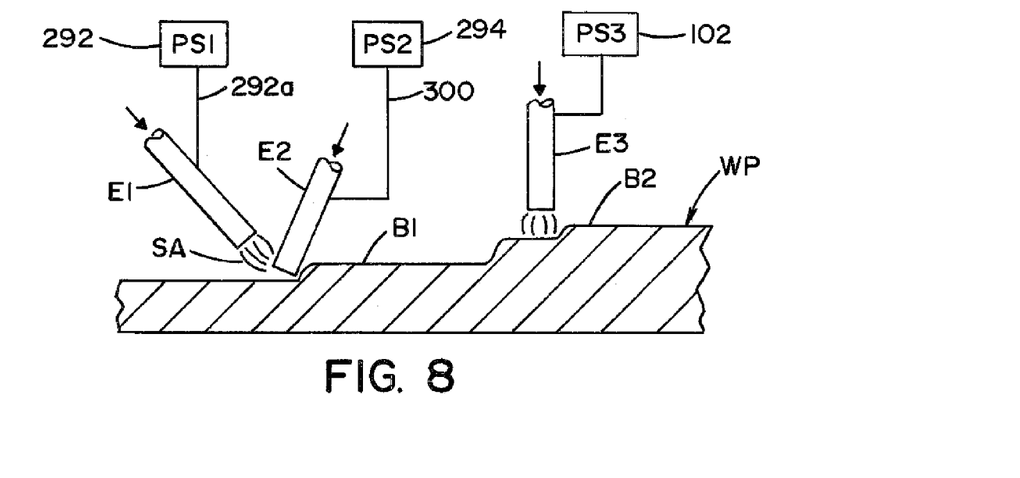
FIG. 8 is a side elevational view of a submerged arc welding process using a welder with two power sources and operated in the series arc configuration.
Figure 9:
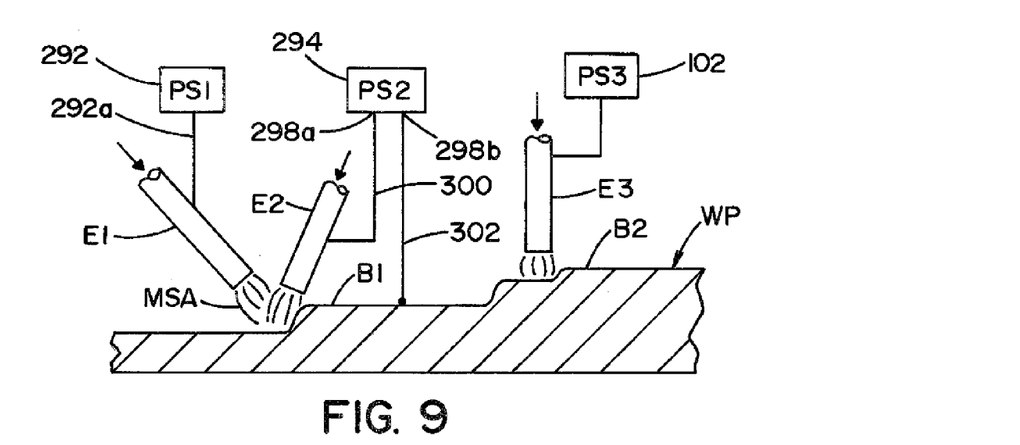
FIG. 9 is a side elevational view similar to FIG. 8 wherein the welder performs a modified series arc process.

The technical distinction between series arc and modified series arc using the novel concept of two power sources as shown in FIG. 11 is schematically represented in FIGS. 8 and 9. In FIG. 8, the power supplies 292, 294 are connected in series across electrodes E1, E2. This connection creates a series arc SA to melt electrodes E1, E2 for forming molten metal bead B1. Trailing electrode E3 receives a waveform from power source 102 to form a subsequent molten metal bead B2. The welder shown in FIG. 11 can be used for series arc welding as schematically illustrated in FIG. 8. By connecting terminal 298b between power source 294 and workpiece WP by line 302, a modified series arc welding process is implemented, as shown in FIG. 9. Modified series arc MSA is created between electrode E1 and electrode E2 and is also directed to workpiece WP, as described in Shutt U.S. Pat. No. 4,246,463. Thus, the welder shown in FIG. 11 can be connected in a series arc configuration of FIG. 8 or the modified series arc configuration of FIG. 9.

Since the second embodiment of the invention as shown in FIG. 11 involves using two separate power sources, waveform generator 260 associated with each power source creates a waveform 500 so that the same waveform is outputted from the two power sources. Waveform 500 for both power sources is created in unison, as shown in FIG. 10; however, the actual current is 180° out of phase in electrodes E1, E2. The power source for tandem electrode E3 is AC waveform 502 which is out of phase with waveform 500 of the two power sources. The phase shift is preferably 90° as shown in FIG. 10. In summary, the waveforms from the first and second power sources are AC waveforms in phase and the waveform for tandem electrode E3 is an AC waveform which is out of phase. The concepts schematically illustrated in FIGS. 8, 9 and 10 are presented to explain the operation and certain features of the embodiment of the invention shown in FIG. 11.

Figure 11A:
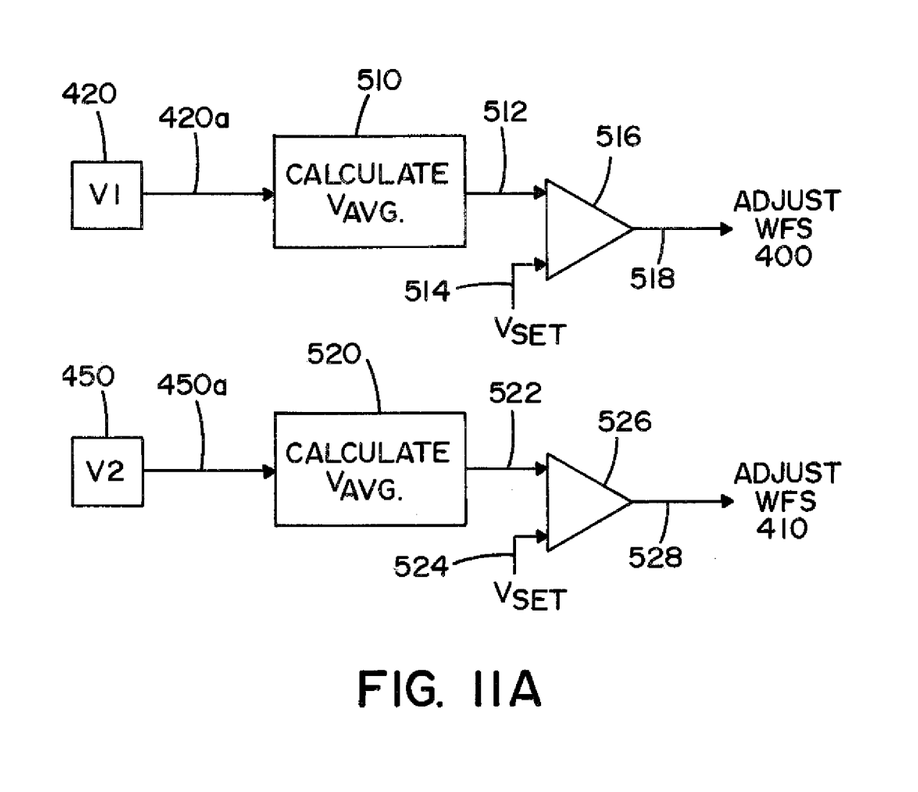
FIG. 11A is a block diagram of the circuits to adjust the desired wire feed speeds in the welder shown in FIG. 11.

To create the wire feed speed for feeder 400 and feeder 410, the digital circuits of the power sources used in the welder shown in FIG. 11 utilizes the voltages on lines 420a and 450a, as schematically illustrated in FIG. 11A. The digital circuits are shown in analog components. The instantaneous voltage from voltage circuit or device 420 on lines 420a is averaged by digital circuit 510 to produce average V1 voltage on line 512. This average voltage is compared with a set voltage on line 514 by error amplifier 516 to create an error signal on line 518. This signal is used to adjust the wire feed speed of feeder 400. In a like manner, the voltage signal on output line 450a is averaged by circuit 520 to produce an average V2 voltage signal on line 522. This signal is compared to the set voltage on line 524 by error amplifier 526 to produce an error signal on line 528. This signal adjusts the wire feed speed of feeder 410. The signals on line 518 and 528 are used to control the speed of motors M1, M2. FIGS. 11 and 11A illustrate the separate control of the two wire feed speeds when using two separate power sources for the series arc welder of FIG. 8 or modified series arc welder of FIG. 9.

Figure 12:
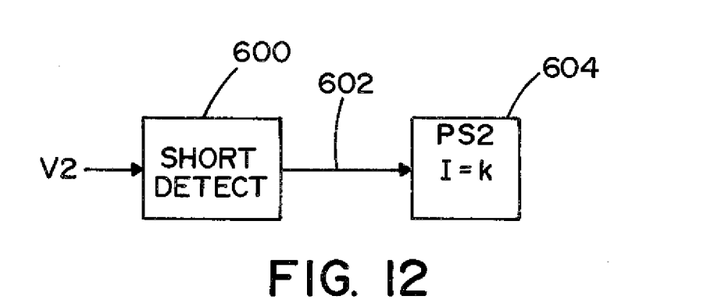
FIGS. 12 and 13 are block diagrams of the circuits used by both embodiments of the invention for responding to a short circuit; and, FIG. 14 is a diagram illustrating a modification of the second embodiment of the present invention as shown in FIG. 11 wherein the two power sources are connected in parallel and used for modified series welding.
Figure 13:
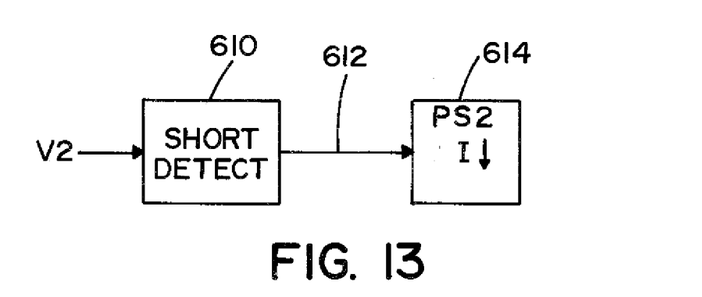

As indicated in FIG. 11, the current from the electrodes to the workpiece is ground current $I_G$. Most inverter type power sources have a standard program for clearing a short between the electrode and workpiece. When there is a short circuit, the ground current $I_g$ increases drastically. To clear the short, the current of the power source is ramped up to burn away the short circuit. When doing this in an architecture involving a modified series arc, as the ground current increases, the current on electrode E2 drastically decreases since power source 294 regulates current in lead 302. This reaction to a short reduces the melting of the second electrode and has a tendency to cause the electrode to be projected against the workpiece. As the current of power source 294 increases, current $I_g$ in the arc decreases. This has created instability. In accordance with an aspect of the invention, this situation involved in a modified series arc welder is rectified or reduced in importance by a circuit which detects the short and then controls the current in electrode E2 with a program that actually controls the current of power source 294 for the purpose of maintaining melting of electrode E2. Furthermore, when electrode E2 is grounded, V2 decreases drastically which affects the wire feed speed control set forth in FIG. 11A. To rectify this current deficiency and correct the speed of the electrode advancing toward the workpiece, a program is employed such as shown in FIG. 12 wherein the voltage across contact or tip 72 and workpiece WP is directed to a standard short detect circuit 600. When there is a short, V2 is reduced and a logic appears on line 602 to activate digital control program 604, which program is a routine that attempts to maintain the current in power source 294 at a given level to effect clearing of the short circuit and decrease the wire feed speed of feeder 410. However, an alternate technique is illustrated in FIG. 13 wherein short detector circuit 610 produces a short signal on line 612 to activate digital program 614. This program decreases current of power source 294. This creates the tendency to decrease the ground current and increase the current in electrode E2. The two circuits shown in FIGS. 12 and 13 are representative in nature and are used to perform an aspect of the invention, wherein a short circuit is detected so constant current power source 294 is controlled to burn away the short circuit and control movement of electrode E2 toward the workpiece. Other programs can be used to control the actual current in electrode E2 or the current created by the second power source.

The invention involves the use of two power sources for use in a modified series arc welding process. In the preferred embodiment of the invention, the two power sources are connected in series, as shown in FIG. 11; however, they may be connected in parallel as schematically illustrated in FIG. 14. Terminal 296a of power source 292 is connected to terminal 298a of power source 294. In like manner, terminal 296b is connected to terminal 298b. To drive contact tip 72, terminal 298b is connected by low resistance lead 620 and the workpiece is connected by lead 622. To show the versatility of the present invention, the wire feed speed of feeder 400 is controlled by a WFS signal on line 294c from second power source 294. The first power source 292 controls the speed of feeder 410 by a signal on line 292c. Both of these signals are created by a feedback technique already described. The various voltages for feedback control of the wire feed speed are within the skill of the art and need not be shown.

Having thus defined the invention, the following is claimed:

1. An electric arc welder for depositing weld metal along a groove between two edges of a metal workpiece, said welder comprising a leading electrode driven toward a point in said groove by a first wire feeder operated at a first speed by a first motor with a speed control input, a trailing electrode driven toward said point by a second wire feeder operated at a second speed by a second motor with a speed control input, and a power source for creating an arc between said leading and trailing electrodes to melt said leading and trailing electrodes, only one of said motors having a tachometer to generate a feedback WFS signal, said power source having a wire feed speed controlling device for creating a control WFS signal directed to said speed control input of said first motor to maintain said first motor at a set speed based upon said feedback WFS signal, said wire feed speed controlling device including a slave circuit that includes a converter and is connected to said control WFS signal to control said speed control input of said second motor, wherein said second motor is operated at a speed below or a speed above said set speed based upon said feedback WFS signal, said control WFS signal independent of a speed of said second motor, said second motor not providing any signal for use in controlling a WFS of said first motor.

2. The welder as defined in claim 1, wherein said first and second motor speeds are generally the same, said control WFS signal connected directly to said control input of said first motor and said control input of said second motor.

3. The welder as defined in claim 1, wherein said trailing electrode is grounded to said workpiece.

4. The welder as defined in claim 1, including a short detector to detect a short between said trailing electrode and said workpiece and a program to maintain the current in said power source generally constant during at least a portion of said short.

5. The welder as defined in claim 1, including a short detector to detect a short between said trailing electrode and said workpiece and a program to decrease the current of said power source during at least a portion of said short.

6. The welder as defined in claim 1, wherein said slave circuit includes a device for decreasing the level of said control WFS signal before it is connected to said control input of said second motor.

7. The welder as defined in claim 1, including a device for reducing the level of said control WFS signal before it is connected to said control input of said first motor.

8. The welder as defined in claim 1, wherein said first and second motors have different ratio gear reducers to drive said first and second wire feeders at different speeds.

9. The welder as defined in claim 2, wherein said trailing electrode is grounded to said workpiece.

10. The welder as defined in claim 3, including a short detector to detect a short between said trailing electrode and said workpiece and a circuit to maintain the current in said second electrode generally constant during at least a portion of said short.

11. The welder as defined in claim 3, including a short detector to detect a short between said trailing electrode and said workpiece and a circuit to increase the current in the second electrode during at least a portion of said short.

12. The welder as defined in claim 4, wherein said constant current is maintained during most of said short.

13. The welder as defined in claim 5, wherein said decreased current is maintained during most of said short.

14. The welder as defined in claim 6, wherein said device is a buck converter.

15. The welder as defined in claim 6, wherein said motor speed of said second motor is different from said speed of said first motor.

16. The welder as defined in claim 10, wherein said constant current is maintained during most of said short.

17. The welder as defined in claim 11, wherein said increased current is maintained during most of said short.

18. An electric arc welder for depositing weld metal along a groove between two edges of a metal workpiece, said welder comprising first and second power sources, a leading electrode driven toward a point in said groove by a first wire feeder operated at a first speed by a first motor with a speed control input and a tachometer derived first feedback signal,
   a trailing electrode driven toward said point by a second wire feeder operated at a second speed by a second motor with a speed control input and a tachometer derived second feedback signal, said first power source directing a first current to flow through said leading electrode and said second power source causing a second current to flow through said trailing electrode with said current flow being in a series arc circuit, said second power source is grounded to said workpiece to modify said series arc current so ground current flows to said workpiece whereby said second current is generally equal to said first current minus said ground current, said tachometer derived first feedback only controlling said first motor and not providing any control signal to said second motor, said tachometer derived second feedback only controlling said second motor and not providing any control signal to said first motor, and
   a voltage sensing circuit and a controller associated with each power source that detects a given voltage associated with each one of said electrodes and accordingly adjusts each said corresponding speed control input.

19. The welder as defined in claim 18, wherein said first speed of said first motor is different from said second speed of said second motor.

20. The welder as defined in claim 18, wherein said first speed of said first motor is generally equal to said second speed of said second motor.

21. The welder as defined in claim 18, including a short detector to detect a short between said trailing electrode and said workpiece and a program to maintain the current in said second power source generally constant during at least a portion of said short.

22. The welder as defined in claim 18, including a short detector to detect a short between said trailing electrode and said workpiece and a program to decrease the current in the second power source during at least a portion of said short.

23. The welder as defined in claim 18, wherein each of said power sources includes a high speed switching output stage for creating one of said currents with selected output waveform generated by a waveform generator controlling a pulse width modulator circuit to determine the current operation of its output stage.

24. The welder as defined in claim 18, wherein said power sources are connected in series.

25. The welder as defined in claim 18, wherein said power sources are connected in parallel.

26. The welder as defined in claim 18, including a wire feed speed controller associated with each power source, and a voltage circuit to detect a given voltage associated with one of said electrodes and a controller with a circuit for adjusting said speed control input based upon said sensed voltage.

27. The welder as defined in claim 18, including a first sensing circuit to sense a first voltage associated with said first wire feeder and a circuit to adjust said first speed based upon said first voltage.

28. The welder as defined in claim 19, including a short detector to detect a short between said trailing electrode and said workpiece and a program to maintain the current in said second power source generally constant during at least a portion of said short.

29. The welder as defined in claim 19, including a short detector to detect a short between said trailing electrode and said workpiece and a program to decrease the current in the second power source during at least a portion of said short.

30. The welder as defined in claim 20, including a short detector to detect a short between said trailing electrode and said workpiece and a program to maintain the current in said second power source generally constant during at least a portion of said short.

31. The welder as defined in claim 20, including a short detector to detect a short between said trailing electrode and said workpiece and a program to decrease the current of the second power source during at least a portion of said short.

32. The welder as defined in claim 20, wherein each of said power sources includes a high speed switching output stage for creating one of said currents with selected output waveform generated by a waveform generator controlling a pulse width modulator circuit to determine the current operation of its output stage.

33. The welder as defined in claim 20, wherein said power sources are connected in series.

34. The welder as defined in claim 20, wherein said power sources are connected in parallel.

35. The welder as defined in claim 20, including a wire feed speed controller associated with each power source, and a voltage circuit to detect a given voltage associated with one of said electrodes and a controller with a circuit for adjusting said speed control input based upon said sensed voltage.

36. The welder as defined in claim 20, including a short detector to detect a short between said trailing electrode and said workpiece and a circuit to clear said short by controlling the current of said second power source.

37. The welder as defined in claim 20, including a first sensing circuit to sense a first voltage associated with said first wire feeder and a circuit to adjust said first speed based upon said first voltage.

38. The welder as defined in claim 21, wherein said constant current is maintained during most of said short.

39. The welder as defined in claim 22, wherein said decreased current is maintained during most of said short.

40. The welder as defined in claim 23, wherein said power sources are connected in series.

41. The welder as defined in claim 23, wherein said power sources are connected in parallel.

42. The welder as defined in claim 23, including a wire feed speed controller associated with each power source, and a voltage circuit to detect a given voltage associated with one of said electrodes and a controller with a circuit for adjusting said speed control input based upon said sensed voltage.

43. The welder as defined in claim 23, wherein said waveforms are AC waveforms in phase with each other.

44. The welder as defined in claim 27, including a second sensing circuit to sense a second voltage associated with said second wire feeder and a circuit to adjust said second speed based upon said second voltage.

45. The welder as defined in claim 28, wherein said constant current is maintained during most of said short.

46. The welder as defined in claim 29, wherein said decreased current is maintained during most of said short.

47. The welder as defined in claim 30, wherein said constant current is maintained during most of said short.

48. The welder as defined in claim 31, wherein said decreased current is maintained during most of said short.

49. The welder as defined in claim 32, wherein said power sources are connected in series.

50. The welder as defined in claim 32, wherein said power sources are connected in parallel.

51. The welder as defined in claim 32, including a wire feed speed controller associated with each power source, and a voltage circuit to detect a given voltage associated with one of said electrodes and a controller with a circuit for adjusting said speed control input based upon said sensed voltage.

52. The welder as defined in claim 37, including a second sensing circuit to sense a second voltage associated with said second wire feeder and a circuit to adjust said second speed based upon said second voltage.

* * * * *